United States Patent [19]
Müller et al.

[11] Patent Number: 5,998,014
[45] Date of Patent: Dec. 7, 1999

[54] FLEXIBLE, DEEP-DRAWING, ELECTRICALLY CONDUCTIVE FILMS

[75] Inventors: Harry Müller, Fürth, Germany; Dirk Schultze, Hadley, Mass.; Friedrich Jonas, Aachen, Germany; Klaus Lerch, Krefeld, Germany; Hans Weber, Rommerskirchen, Germany

[73] Assignee: Bayer Aktiengesellschaft, Germany

[21] Appl. No.: 08/889,042

[22] Filed: Jul. 7, 1997

[30] Foreign Application Priority Data

| Jul. 11, 1996 | [DE] | Germany | 196 27 904 |
| Jul. 30, 1996 | [DE] | Germany | 196 30 669 |
| Jan. 8, 1997 | [DE] | Germany | 197 00 365 |

[51] Int. Cl.$^6$ ............ B32B 27/30; B32B 27/32; B32B 27/36; B32B 27/40; B32B 27/34

[52] U.S. Cl. ............ 428/335; 428/35.2; 428/36.9; 428/36.92; 428/412; 428/423.3; 428/423.5; 428/423.7; 428/424.4; 428/424.6; 428/424.8; 428/922

[58] Field of Search ............ 428/423.1, 922, 428/35.2, 36.9, 36.91, 334, 335, 412, 423.3, 423.5, 423.7, 424.4, 424.6, 424.8

[56] References Cited

U.S. PATENT DOCUMENTS 5,370,981 12/1994 Krafft et al. ............ 430/529
5,478,616 12/1995 Kochem et al. ............ 428/35.2

FOREIGN PATENT DOCUMENTS

| 0 302 304 | 2/1989 | European Pat. Off. . |
| 0 339 340 | 11/1989 | European Pat. Off. . |
| 0 440 957 A2 | 8/1991 | European Pat. Off. . |
| 0 564 911 A2 | 10/1993 | European Pat. Off. . |
| 0 593 111 A1 | 4/1994 | European Pat. Off. . |
| 0767009A1 | 4/1997 | European Pat. Off. . |
| 42 11 459 A1 | 10/1993 | Germany . |
| 0 752 454 A2 | 1/1997 | Germany . |

OTHER PUBLICATIONS

Jonas F ET AL: "Technical Applications for Conductive Polymers" Electrochimica ACTA, Bd. 39, Nr. 8/09, Jun. 1, 1994, pp. 1345–1347.

Patent Abstracts of Japan, vol. 097, No. 006, Jun. 30, 1997 & JP 09 031222 A Feb. 4, 1997.

Patent Abstracts of Japan, vol. 097, No. 009, Sep. 30, 1997 & JP 09 131843 A, May 20, 1997.

*Primary Examiner*—D. S. Nakarani
*Attorney, Agent, or Firm*—Connolly, Bove, Lodge & Hutz LLP

[57] ABSTRACT

Thermally and mechanically formable polymer film, characterised by a transparent antistatic coating of a mixture of 3,4-polyethylene dioxythiophene with a thermally or mechanically formable binder, its production and its use for packaging electronic components.

7 Claims, No Drawings

FLEXIBLE, DEEP-DRAWING, ELECTRICALLY CONDUCTIVE FILMS

The present invention provides flexible, electrically conductive films in thicknesses of 10 to 1,000 μm, preferably 50 to 400 μm, which can be thermally or mechanically formed, are highly transparent and the action of which is independent of the air humidity. The films are characterised by a transparent antistatic coating of a mixture of 3,4-polyethylene dioxythiophene with a binder which can be thermally or mechanically formed. The polymer films which are used may be any deep-drawing films (e.g. PA, PC, PU, PVC, PET, PEN, PS, PMMA, PP, PE). The films according to the invention may be used, e.g. for packaging electronic components, for which protection against electrostatic discharge is of particular importance.

The use of electrically conductive, antistatic films for packaging sensitive contents has been known for a long time. For example, electrically conductive films are used to package electronic components or component groups (e.g. transistors and integrated circuits) in order to minimise the risk of an electrostatic discharge, which could result in the electronic components being destroyed. Even voltages below 100 V may lead to irreversible damage and make the components unfit for use. Because of the increasing miniaturisation of electronic components, their sensitivity and the necessary protection against electrostatic discharge are matters of increasing priority.

When inserting electronic components in printed circuit boards, for example, these components are delivered to the processing machines at very high speeds by way of so-called blister belts, i.e. deep-drawn film belts, which contain the components and are closed by narrow sealing tape. Because of the friction which occurs, packaging films of organic polymers become charged to voltages of up to several kilovolts during this processing operation, which on the one hand may cause the lightweight components to adhere firmly to the packaging film or may result in the components being destroyed by subsequent discharge reactions. It is imperative to provide protection against charging in this application.

It is also imperative to protect combustible or explosive contents against electrostatic discharge. The films according to the invention may also be used for packaging these critical contents.

It is prior art to give the polymer packaging films which are used antistatic properties when packaging contents which are vulnerable to the effects of electrostatic discharge (e.g. electronic components). This may be achieved either by means of a surface coating or by directly working a conductive substance (e.g. conductive carbon black) or an ionic antistatic agent into the polymer concerned. If using conductive carbon black, the conductivity is induced from a certain level of filling with carbon black (percolation point) by the carbon black network forming within the plastic-polymer matrix.

Although packaging films which are filled with carbon black have good electrical/antistatic properties, they have the disadvantage of not being transparent and therefore obscuring the packaged contents. Moreover, carbon black-filled films can only be deep-drawn within certain limits, as over-drawing, particularly in the corners of, e.g. blister packs, pulls apart the necessary carbon black network and the conductivity is thereby lost.

If ionic antistatic agents are added to the polymers, although the resulting packaging films are transparent, the antistatic agents only have an effect at high air humidity levels.

It is known from EP-A 302 304 and EP-A 339 340 to use polycarbonate films which are coated with electrically conductive polymers so as to be given transparent and antistatic properties in order to produce blister belts. Examples of suitable polymers are polypyrrole and polythiophenes such as 3,4-polyethylene dioxythiophene. The production of these coatings is known and is based on the polymerisation of the monomers from which the conductive polymers are derived at the film surface by means of suitable oxidizing agents such as iron(III) salts. However in this case the production of the antistatic coating requires a number of process steps and the oxidizing agent has to be removed from the coating following polymerisation, e.g. by means of water.

It is also known (cf. EP-A 440 957) to coat films with solutions or dispersions of conductive polythiophenes, especially of 3,4-polyethylene dioxythiophene, so as to be given transparent and antistatic properties. However these layers cannot be mechanically or thermally formed.

The object is therefore to produce a flexible, electrically conductive film which is largely transparent, independent of humidity and can be thermally or mechanically formed and therefore has distinct advantages over the prior art.

This is achieved according to the invention by coating polymer films with solutions and dispersions of 3,4- polyethylene dioxythiophene which have been combined with special organic binders. Polymer films with these transparent antistatic coatings can be thermally and/or mechanically formed.

The production of the solutions or dispersions of 3,4-polyethylene dioxythiophene to be used according to the invention is described in DE-OS 4 211 459.

Suitable binders are those which can themselves be easily formed, ie. are soft, during thermal forming of the coated polymers. Binders whose softening temperature is lower than that of the coated polymer are therefore preferred. When mechanical forming is employed the polymer layers must exhibit a high elongation at break, preferably >100%.

Examples of suitable binders for the method according to the invention are solutions and dispersions of homopolymers and copolymers of vinyl acetate, vinylidene chloride, methyl methacrylate, other acrylates and mixtures thereof.

Polyurethane latices are particularly suitable.

Aqueous solutions or dispersions are preferably used.

The coating solutions comprise between 50 and 4,000 wt. % of solid binder, preferably between 100 and 2,000 wt. %, related to the solids content of conductive polymer.

Apart from water, the coating solutions may comprise water- miscible organic solvents such as low molecular-weight alcohols, methanol, ethanol, isopropanol, organic amides, dimethylformamide, dimethylacetamide, N-methylpyrrolidone, N-methylcaprolactam, ketones, acetone, methyl ethyl ketone, diacetone alcohol, ether, tetrahydrofuran, dioxan.

Additives for increasing conductivity (e.g. sorbitol) are also possible (cf. EP-A 686 662).

The total solids content of the coating solutions is usually—depending on the coating method used and the coating thickness to be achieved—between 0.1 and 50 wt. %.

Suitable coating methods are, e.g. spraying, printing (gravure printing, offset printing, screen printing), roll coating, curtain coating, knife coating.

The dry layer thickness is usually between 0.05 and 100 μm, preferably 0.5 and 50 μm.

The film thickness is usually between 10 and 1,000 μm, preferably 50 and 400 μm.

The polymer base films may consist, e.g. of the following thermoplastic polymers:
PA=polyamide
PC=polycarbonate
PU=polyurethane
PVC=polyvinyl chloride
A-PET=amorphous polyethylene terephthalate
PEN=polyethylene naphthalate
PS=polystyrene
PMMA=polymethyl methacrylate
PP=polypropylene
PE=polyethylene Blends of these polymers and copolymers of the corresponding monomers can also be used.

The plastics base films may be single- or multi-layer, with individual layers being joined together by means of conventional laminating adhesive or primer interlayers.

The plastics base films may comprise in their individual layers the additives and auxiliary substances usually used when processing films, such as, e.g. lubricants, anti-blocking agents, antistatic agents, $TiO_2$, $CaCO_3$.

The thermal forming process, e.g. by deep drawing or by means of rams, takes place at temperatures at which the film materials soften but do not yet melt.

EXAMPLES

Production of the 3,4-polyethylene dioxythiophene solution 20 g of free polystyrene sulphonic acid ($\overline{M}_n$ approx. 40,000), 21.4 g of potassium peroxodisulphate and 50 mg of iron(III)-sulphate are stirred into 2,000 ml of water. 8.0 g of 3,4- ethylene dioxythiophene are added while stirring. The solution is stirred at ambient temperature for 24 hours. 100 g of anion exchanger (commercial product Bayer AG Lewatit MP 62) and 100 g of cation exchanger (commercial product Bayer AG Lewatit S 100), both wetted with water, are then added and stirring is continued for 8 hours.

The ion exchangers are removed by filtration. A ready-for-use 3,4-polyethylene dioxythiophene solution with a solids content of approximately 1.2 wt. % is obtained.

Comparative Example

The 3,4-polyethylene dioxythiophene solution described above is applied by means of a coating knife to a 200 µm thick, 30×30 cm² polycarbonate film, resulting in a dry layer thickness of 100 mg/m². The coated film has a surface resistance of $10^4$ Ω/□. The film is then formed by deep drawing at approximately 180° C. After deep drawing the antistatic coating exhibits cracks and has a surface resistance of >$10^{10}$ Ω/□ at the formed points. The antistatic effect has been destroyed by the deep-drawing process.

Example 1

A 30% mixture of 6.5 g of the 3,4-polyethylene dioxythiophene solution described above, 3.0 g of dimethylacetamide, 10.0 g of acetone, 5.0 g of methanol, 3.0 g of N-methylpyrrolidone and 2.5 g of polyvinyl acetate (Mowilith 50, commercial product of the firm Hoechst) in acetone is applied by a coating knife to a 200 µm thick polycarbonate film in an approximately 60 µm wet layer thickness and dried. The coated film has a surface resistance of $10^4$ Ω/□. The film is then formed by deep drawing at approximately 180° C. After deep drawing the antistatic coating has a surface resistance of $10^4$–$10^5$ Ω/□ at the formed points. The antistatic effect of the layer has not been negatively affected by the deep drawing.

Example 2

A mixture of 8.3 g of the 3,4-polyethylene dioxythiophene solution described above, 2.3 g of a 40% aqueous polyurethane solution (Bayderm Finish UD, commercial product of Bayer AG) and 0.5 g of N-methylpyrrolidone is applied by a coating knife in a wet layer thickness of approximately 60 µm to a 150 µm thick polycarbonate film and dried. The coated film has a surface resistance of $10^3$ Ω/□. The film is then formed by deep drawing at approximately 180° C. After deep drawing the antistatic coating has a surface resistance of $10^4$–$10^5$ Ω/□ at the formed points. The antistatic effect of the layer is preserved after deep drawing.

Example 3

The procedure is as in Example 2, although here the polycarbonate film is replaced by a 200 µm thick film of polyvinyl chloride. The coated film has a surface resistance of 3×$10^3$ Ω/□. The film is then formed by deep drawing at approximately 180° C. After deep drawing the antistatic coating has a surface resistance of 2×$10^4$ Ω/□ at the formed points. The antistatic effect of the layer is preserved after deep drawing.

We claim:

1. A film selected from the group consisting of polyamide, polycarbonate, polyurethane, polyvinyl chloride, amorphous polyethylene terephthalate, polyethylene naphthalate, polystyrene, polymethyl methacrylates, polypropylene, polyethylene, blends of these polymers, and copolymers of the corresponding monomers, prepared by thermally or mechanically forming a polymer film having a transparent antistatic coating of a mixture of 3,4-polyethylene dioxythiophene with a thermally or mechanically formable polyurethane binder.

2. The film of claim 1, wherein the coating has a dry layer thickness of from 0.5 to 50 µm.

3. A packaging material for components which are vulnerable to electrostatic effects, comprising the polymer film of claim 1.

4. A blister belt for packaging components which are vulnerable to electrostatic effects, comprising the polymer film of claim 1.

5. A packaging material for inflammable or explosive contents, comprising the polymer film of claim 1.

6. A thermally or mechanically formable polymer film having a transparent antistatic coating of a mixture of 3,4-polyethylene dioxythiophene with a thermally or mechanically formable binder, and wherein the polymer film is multi-layered, with individual layers being joined together by means of adhesive or primer interlayers.

7. A thermally or mechanically formable polymer film having a transparent antistatic coating of a mixture of 3,4-polyethylene dioxythiophene with a thermally or mechanically formable polyurethane binder.

* * * * *